United States Patent
Gronau et al.

(10) Patent No.: US 6,364,435 B1
(45) Date of Patent: Apr. 2, 2002

(54) METHOD AND DEVICE FOR REGULATING THE DRIVING STABILITY OF A VEHICLE

(75) Inventors: Ralph Gronau, Wetter; Jürgen Woywod, Mörfelden; Gunther Buschmann, Idstein; Thomas Kranz, Rosbach, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/485,214

(22) PCT Filed: Jul. 31, 1998

(86) PCT No.: PCT/EP98/04791

§ 371 Date: May 10, 2000

§ 102(e) Date: May 10, 2000

(87) PCT Pub. No.: WO99/07589

PCT Pub. Date: Feb. 18, 1999

(30) Foreign Application Priority Data

Aug. 4, 1997 (DE) .......................... 197 33 676

(51) Int. Cl.$^7$ ................................ B60T 8/32
(52) U.S. Cl. ................. 303/154; 303/139; 303/146; 303/113.2; 303/11
(58) Field of Search ................ 303/140, 139, 303/146, 154, 113.2, 116.1, 119.1, 10, 11

(56) References Cited

U.S. PATENT DOCUMENTS 4,940,293 A * 7/1990 Burckhardt et al. ........ 303/110
5,524,974 A * 6/1996 Fischle et al. ............... 303/191
5,727,852 A * 3/1998 Pueschel et al. .......... 303/113.2
5,738,420 A * 4/1998 Kawaguchi et al. ........ 303/146
5,779,328 A * 7/1998 Mergenthaler et al. 303/122.12
5,788,345 A * 8/1998 Sakane et al. ............... 303/146
5,797,663 A * 8/1998 Kawaguchi et al. ........ 303/146
5,845,975 A * 12/1998 Wells .......................... 303/126
5,984,430 A * 11/1999 Koga et al. ............... 303/116.1

FOREIGN PATENT DOCUMENTS

| DE | 40 37 468 | 5/1992 |
| DE | 195 35 623 | 4/1996 |
| DE | 44 45 360 | 6/1996 |
| DE | 196 26 395 | 1/1997 |
| DE | 195 47 111 | 6/1997 |
| DE | 196 07 048 | 8/1997 |
| DE | 196 15 294 | 10/1997 |

* cited by examiner

Primary Examiner—Douglas C. Butler
Assistant Examiner—Devon Kramer
(74) Attorney, Agent, or Firm—Rader, Fishman & Grauer PLLC

(57) ABSTRACT

A device for controlling the driving stability of a vehicle includes a detection device for detecting an operating condition of the vehicle, a device for building up braking pressure for at least one of the wheels, and an influencing device which influences the braking pressure of one or more wheels in dependence on the detected operating condition of the vehicle. The above device also comprises a starting device which activates the device for building up braking pressure in idle mode before the commencement of an operating condition which initiates influencing of the braking pressure.

18 Claims, 1 Drawing Sheet

METHOD AND DEVICE FOR REGULATING THE DRIVING STABILITY OF A VEHICLE

TECHNICAL FIELD

The present invention generally relates to vehicle control systems, and more particularly relates to a method and a device for controlling the driving stability of a vehicle.

BACKGROUND OF THE INVENTION

Significant operating conditions of the vehicle are monitored in the prior art driving stability control. When such an operating condition indicates that the driving stability of the vehicle is jeopardized, an intervention will follow to the end that, among other measures, the braking pressure on one or more wheels of the automotive vehicle can appropriately be increased to ensure stable driving. The following occurs in detail: as soon as it is detected that an operating condition prevails which requires an intervention in the way of increase of braking pressure on at least one of the wheels, a pump is activated which can build up the necessary braking pressure. Further, valves are switched so as to permit fluid circulation between the fluid reservoir, the pump, the return line and the brake cylinder in a suitable fashion.

This method suffers from the disadvantage that the correcting intervention takes place only with a delay in time after the situation requiring correction is detected. This is because before it is possible to supply braking pressure to the brake of a wheel, the pump supplying the pressure must start to operate and, if necessary, valves must be switched in an appropriate manner. Thus, precious time passes until a correcting intervention. German patent application No. 195 35 623 discloses a method of controlling the driving stability of a vehicle wherein a device which builds up the braking pressure of one or more wheels is started before the commencement of an operating condition which initiates the influencing of braking pressure.

An object of the present invention is to provide a method and a device for controlling the driving stability of a vehicle which become effective quickly after a situation requiring correction is detected.

DETAILED DESCRIPTION OF THE PREFERRED EMBODIMENTS

Figure 1:
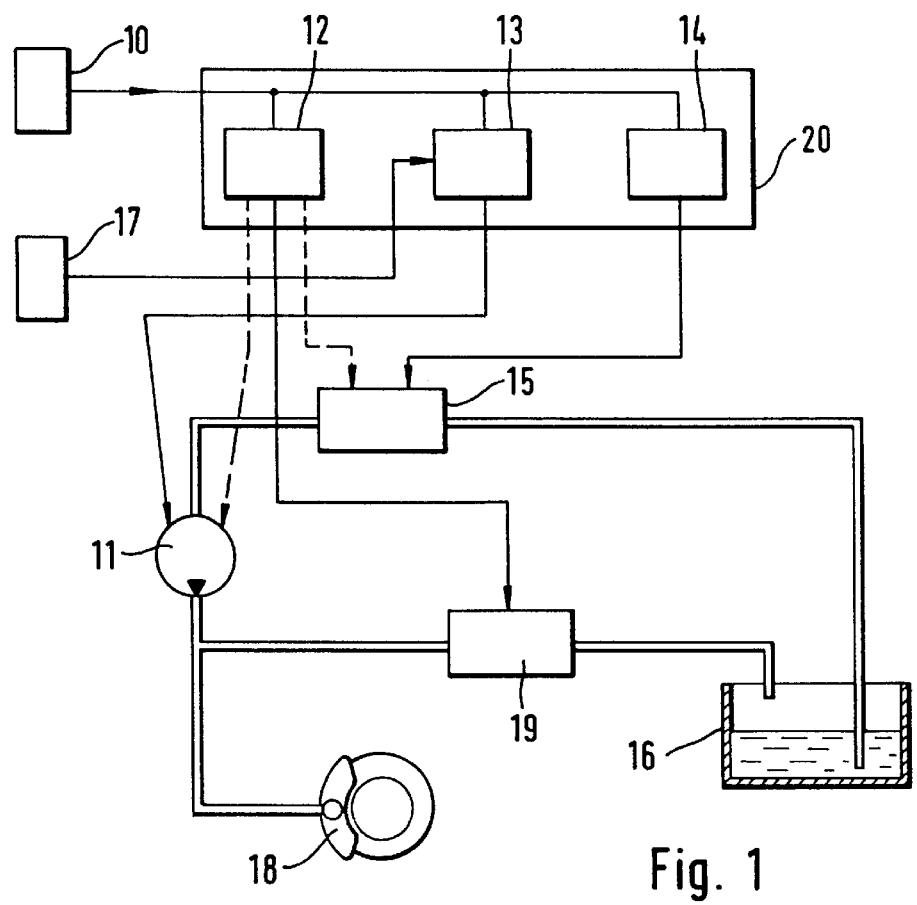
FIG. 1 shows in a combination a plurality of embodiments of the present invention.

FIG. 1 is a schematic view of individual system components. Reference numeral 10 designates a detection device, preferably a sensor for detecting an operating condition of a vehicle. The operating condition detected is a condition which is significant for assessing the question of need for driving stability control. The device 10 may be a single sensor, for example, a steering angle sensor. However, the device 10 may also be a more complex device which produces the above-mentioned significant signal from various other input signals.

Reference numeral 11 designates a device for building up braking pressure. Preferably, the device is a hydraulic pump. It receives hydraulic fluid from a reservoir 16 by way of a valve 15 and can furnish it to the brake cylinder of a brake 18 of a wheel. Between the outlet side of the pump 11 and the brake cylinder is a return line to the reservoir 16 through which hydraulic fluid can propagate, either from the brake cylinder or the pump 11, by way of a valve 19 to the reservoir 16 or, as is shown, in front of the valve 15.

Reference numeral 12 designates an influencing device which activates e.g. the valve 19 in the return line. The influencing device 12 can open or close the valve 19 in dependence on the signal received in the detecting device 10. The pressure at the brake cylinder of the brake 18 decreases or increases accordingly so that the braking pressure is influenced this way. When the valve 19 (and the valve 15, see below) is opened, the pump 11 is in idle mode, and the fluid it delivered will return to the reservoir 16 without causing braking intervention. If, however, the valve 19 is closed, the above-mentioned 'bypass' is interrupted, and the fluid delivered by the pump 11 is conducted to the hydraulic cylinder of the brake 18 and increases the brake force.

In the state of the art, the influencing device 12 additionally causes start up of the pump 11 and opening of the supply valve 15. In FIG. 1, this is indicated by the signal conduits (shown in broken lines) between the influencing device 12 and pump 11 or supply valve 15.

According to the present invention, an outlet device 13 is provided which also receives the output signal of the detection device 10 and sets the pump 11 to operate before the influencing device 12 initiates the actual control intervention described hereinabove. The start of the pump 11 which requires a certain time will then take place during an interval where a correcting control intervention is not yet considered necessary. However, the pump output is available instantaneously at maximum rotational speed when the influencing device 12 wants to perform the correcting intervention. The pump 11 is switched on or started in idle mode. This means that the two valves 15 and 19 are opened so that the pump receives hydraulic fluid on its inlet side and delivers it back into the reservoir 16. To this end, an opening device 14 is preferably provided which also receives the signal from the detection device 10 and opens the supply valve 15 before the actual operating condition occurs which requires the intervention of the control. Preferably, the valve 15 is opened at the time and the condition of the pump 11 being put into operation.

The influencing device 12, starting device 13 and opening device 14 favorably operate in dependence on threshold values. They receive the quantitative signal from the detection device 10 and become active in dependence on threshold values. When it is assumed that a high value of the output signal of the detection device 10 causes intervention of the control, the starting device 13 (and, if necessary, opening device 14) starts its action at a lower threshold value, while the influencing device 12 starts its action at a higher threshold value. Favorably, the starting device 13 and the opening device 14 initiate their respectively associated functions as soon as the signal from the detection device 10 has exceeded a first threshold value $S_1$, while the influencing device 12 influences the braking pressure when the signal has exceeded a second, higher threshold value $S_2$. Accordingly, reverse conditions occur when the detection device 10 furnishes a signal which is meant to trigger an intervention of the control at a low value.

The detection device 10 may be a sensor which senses a quantity that mirrors or influences the vehicle stability. For example, the yaw rate (rotation about the vertical axis) can be sensed by an appropriate sensor, or the transverse acceleration of the vehicle. The detection device 10 may also be a steering angle gradient sensor. The sensor can sense the angular velocity on the steering wheel. High angular velocities (possibly linked to higher vehicle speeds in order to filter out situations, for example, when parking a vehicle) indicate a highly dynamic driving maneuver which can make necessary an intervention for controlling the driving stability.

The detection device 10 does not necessarily have to be a sensor. It can also be a device which uses other signals prevailing in the vehicle control or combines them to generate an appropriate signal.

The present invention may arrange for the threshold values of the starting device 13 (and the opening device 14) to vary temperature-responsively. It is favorable that the threshold values are reduced when the outside temperature drops. The longer start-up of the pump 11 due to impaired viscosity of the brake fluid is thereby compensated. A temperature detecting means 17 can furnish a signal to the starting device 13 in this respect.

Various stop or prevention criteria can be provided for the above-described measures of the present invention, especially the activating of the device 11 for braking pressure build up, i.e., the output signal of the detection device 10 drops below a third threshold value $S_3$, which is preferably lower than the first threshold value $S_1$ so that a hysteresis-like behavior results.

intervention by the driver, which can be read, for example, from the brake light switch or the pressure sensor on the brake master cylinder. Measures taken by the driver will the not be influenced by the measures described hereinabove.

pressure or residual pressure in the hydraulic system.

The method described hereinabove can be prevented, interrupted or modified by one or more of the above-mentioned criteria.

An embodiment has so far been described wherein the influencing device 12 and the starting device 13 receive and monitor the same signal (from the same detection device 10). Apart therefrom, embodiments are also possible in which the devices receive different signals, and the signals are so selected that usually the starting device 13 responds before the influencing device 12 does. In this embodiment, the starting device 13 can be so configured that it initiates its action (activating the pump 11) when the influencing device 12 has responded.

When the influencing device 12 and the starting device 13 detect the same signal, their threshold values $S_1$ and $S_2$ can be so rated that $S_1$ amounts to 30 to 70% of $S_2$, favorably 45 to 55%.

Up to now embodiments have been described which concerned one single wheel of the vehicle only. The present invention can be used for all or several wheels of the vehicle, and pump(s) 11 or, respectively, supply valve(s) 15 can be switched separately of each other or in parallel.

Further, the above-described embodiments relate to a control method or a control device which a priori become active irrespective of the ABS (anti-lock system) without its control intervention. But it is also possible to use the method of the present invention and the ABS in parallel by way of suitable coordination functions.

The above-mentioned influencing device 12, starting device 13 and opening device 14 may be discreet assembly units. However, they may also be part of a brake assistant 20 and, if necessary, implemented as a form of a control or regulating algorithm with suitable drivers for the mechanical control elements.

Figure 2:
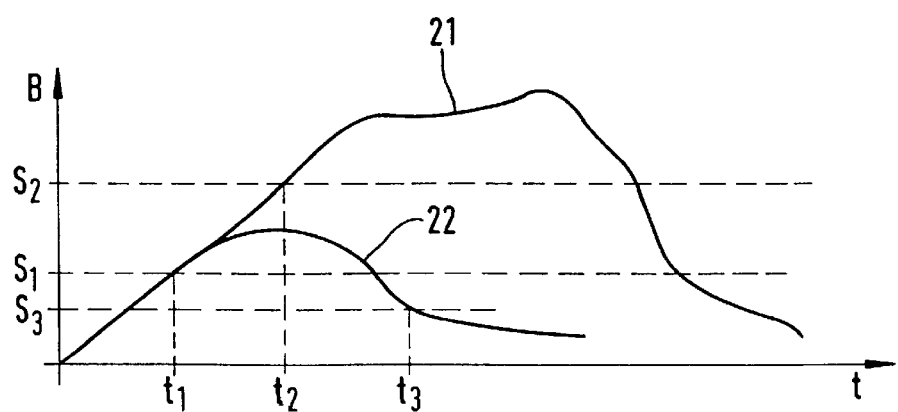
FIG. 2 is a graph of vehicle operating condition versus time.

The embodiment of FIG. 2 shows various forms of the signal evaluation of the present invention. Curve 21 shows the variation of a signal B which indicates that operating condition of the vehicle which is significant for triggering the brake intervention. The first threshold value $S_1$ is exceeded at time $t_1$. According to the present invention, the starting device 13 will then start its action and activate the pump 11. At time $t_2$, the signal B exceeds the second threshold value $S_2$ so that the influencing device is then able to very quickly develop the braking pressure by way of the pump 11 which is already running. A different signal course is shown in curve 22. In this curve, the signal B does not exceed the second threshold value $S_2$. At time $t_1$, the threshold value $S_1$ is exceeded and the pump 11 activated accordingly. However, the third threshold value remains under at time $t_3$. Then, pump 11 is deactivated again.

FIG. 2 shows again that embodiment where the starting device 13 and the influencing device 12 operate in dependence on the same signal B. The devices may react to different signals nevertheless.

The object of the present invention is the method described hereinabove and in the claims as well as the device which is preferably used to implement this method.

The present invention permits reducing the dead time caused by the start up of a pump. Because the pump is additionally caused to adopt the maximum rotational speed prior to the actual intervention of the control, without a counterpressure prevailing, the pump reaches this maximum rotational speed very quickly. Also, the present invention eliminates the need for a precharging device, such as a second pump or a booster.

What is claimed is:

1. Method of controlling the driving stability of a vehicle having a device which builds up the braking pressure of one or more of the wheels, comprising the steps of:

sensing a vehicle parameter, commencing operation of said device in an idling mode when said vehicle parameter exceeds a first threshold value, commencing operation of said device in an operating mode when said vehicle parameter exceeds a second threshold value which initiates the influencing of the braking pressure, and terminating operation of said device when said vehicle parameter falls below a third threshold value.

2. Method as claimed in claim 1, wherein said first threshold value is lower than the second threshold value.

3. Method as claimed in claim 1, wherein commencing operation of said device in an idling mode includes opening a valve between the device which builds up the braking pressure and a fluid reservoir generally simultaneously with the activation of the device which builds up the braking pressure.

4. Method as claimed in claim 1, wherein said vehicle parameter is a transverse acceleration or a yaw rate of said vehicle.

5. Method as claimed in claim 1, wherein said vehicle parameter is a steering angle gradient.

6. Method as claimed in claim 2, further including the step of reducing the first threshold value when the temperature outside of the vehicle falls below a defined value.

7. Method as claimed in claim 1, further including the step of preventing said device from entering into at least one of said idling mode or said operating mode in dependence on another operating condition.

8. Device for controlling the driving stability of a vehicle, comprising:

a detection device for detecting a first operating condition of the vehicle, a device which builds up the braking pressure for at least one of the wheels, and an influencing device which influences the braking pressure of one or more wheels in dependence on the detected operating condition of the vehicle, a starting device which, before the commencement of an operating condition that initiates the influencing of the braking pressure, activates the device which builds up the braking pressure, wherein the starting device activates the device which builds up the braking pressure as soon as the first operating condition has exceeded a first threshold value, the influencing device influences the braking pressure as soon as the first operating condition has exceeded a second threshold value which is higher than the first threshold value, and the device which builds up the braking pressure is deactivated when said vehicle parameter falls below a third threshold value.

9. Device as claimed in claim 8, wherein the detection device detects the first operating condition quantitatively.

10. Device as claimed in claim 8, further including an opening device for opening a valve which is disposed between the device which builds up the braking pressure and a fluid reservoir.

11. Device as claimed in claim 8, wherein the first operating condition is a transverse acceleration or a yaw rate.

12. Device as claimed in claim 8, wherein the first operating condition is a steering angle gradient.

13. Device as claimed in claim 9, wherein the starting device reduces the first threshold value when the outside temperature falls below a defined value.

14. Device as claimed in claim 8, further including means for preventing said device from building up the braking pressure in dependence on a second operating condition.

15. Device as claimed in claim 8, wherein the first threshold value is in the range of approximately 30 to 70 percent of the second threshold value.

16. Device as claimed in claim 8, wherein the first threshold value is in the range of approximately 45 to 55 percent of the second threshold value.

17. Method of controlling the driving stability of a vehicle having a device which builds up the braking pressure of one or more of the wheels, comprising the steps of:

sensing a vehicle parameter;

commencing operation of the device in an idling mode when said vehicle parameter exceeds a first threshold value;

commencing operation of the device in an operating mode when said vehicle parameter exceeds a second threshold value which initiates the influencing of the braking pressure, wherein said first threshold value is lower than the second threshold value; and reducing said first threshold value when the temperature outside of the vehicle falls below a defined value.

18. Device for controlling the driving stability of a vehicle having a plurality of wheels, comprising:

a detection for detecting a first operating condition of the vehicle;

a device for building up the braking pressure for at least one of the wheels;

an influencing device which influences the braking pressure of one or more wheels in dependence on the detected operating condition of the vehicle;

a starting device which, before the commencement of an operating condition that initiates the influencing of the braking pressure, activates the device which builds up the braking pressure; and wherein the detection device detects the first opening condition quanitatively, the starting device activates the devices which builds up the braking pressure as soon as the first operating condition has exceeded a first threshold value, the influencing device influences the braking pressure as soon as the first opening condition has exceeded a second threshold value which is higher than the first threshold value, and the starting device reduces the first threshold value when the outside temperature falls below a defined value.

* * * * *

UNITED STATES PATENT AND TRADEMARK OFFICE
CERTIFICATE OF CORRECTION

PATENT NO. : 6,364,435 B1  
DATED : April 2, 2002  
INVENTOR(S) : Ralph Gronau et al.

It is certified that error appears in the above-identified patent and that said Letters Patent is hereby corrected as shown below:

Column 6,
Line 32, please change "devices which builds" to -- device which builds --.

Signed and Sealed this

Fifteenth Day of October, 2002

Attest:

Attesting Officer

JAMES E. ROGAN
Director of the United States Patent and Trademark Office